United States Patent Office 3,657,376
Patented Apr. 18, 1972

3,657,376
PRODUCTION OF ISOPRENE
Adolf Stuebinger and Herbert Mueller, Frankenthal, and Hermann Overwien, Ludwigshafen, Germany, assignors to Badische Anilin- & Soda-Fabrik Aktiengesellschaft, Ludwigshafen (Rhine), Germany
No Drawing. Filed June 3, 1970, Ser. No. 43,244
Claims priority, application Germany, June 6, 1969,
P 19 28 632.9
Int. Cl. C07c *1/00, 1/24*
U.S. Cl. 260—681
3 Claims

ABSTRACT OF THE DISCLOSURE

Process for the manufacture of isoprene by catalytic dehydration of 3-methyl-3-buten-1-ol in the presence of calcium phosphate as catalyst at elevated temperatures, wherein dehydration is carried out, preferably in the presence of steam, at temperatures between 200° and 300° C. using a 3-methyl-3-buten-1-ol having a purity of at least 85% by weight based on the total weight of oxygen-containing organic compounds present in the starting material. Isoprene is an important monomer, for example in the production of synthetic rubber.

---

The present invention relates to a process for the manufacture of isoprene by catalytic dehydration of 3-methyl-3-buten-1-ol.

A number of processes for the production of isoprene have already been described. Thus it is known, for example, to produce isoprene by dehydrogenating $C_5$ hydrocarbon mixtures. Another known method of preparing isoprene comprises the dimerization of propylene followed by the elimination of methane from the intermediate. It is also known to react isobutylene with formaldehyde to produce 4,4-dimethyl-1,3-dioxane and to prepare isoprene from this compound by catalytic splitting. Another known process for the manufacture of isoprene comprises dehydrating 2-methyl-3-buten-2-ol, which may be prepared by reacting acetone with acetylene. The above processes suffer from the disadvantage, however, that the preparation of the starting materials used therein is not sufficiently economical and/or that the reaction to produce isoprene is not sufficiently selective and gives unsatisfactory yields.

It is an object of the invention to provide a process for the manufacture of isoprene in which the reaction to form isoprene is highly selective and produces good yields and wherein the starting materials used are available from economic processes.

In accordance with the invention this and other objects and advantages are achieved in a proces for the manufacture of isoprene by catalytic dehydration of 3-methyl-3-buten-1-ol in the presence of calcium phosphate as catalyst at elevated temperatures, wherein a 3-methyl-3-buten-1-ol having a purity of at least 85% by weight with reference to the total weight of oxygen-containing organic compounds present in the starting material, is used and the reaction is carried out at temperatures of from 200° to 300° C.

According to the present invention isoprene is produced in excellent yield and high purity from a starting material which may be simply and economically prepared by reacting isobutylene with formaldehyde (see German published application DAS No. 1,275,049).

It is surprising that the present process produces excellent yields, because it is disclosed in Petroleum Chemistry U.S.S.R., vol. 4 (1955), pp. 211–220, that the dehydration of a 3-methyl-3-buten-1-ol having a purity of only 77% by weight, carried out at temperatures between 200° and 300° C. in contact with calcium phosphate, produces only moderate yields of isoprene, for example less than 20% of the theory at 250° C.

The starting material used for the dehydration process has a purity of at least 85% and preferably of at least 90% by weight with reference to the total weight of oxygen-containing organic compounds present in the starting material. Usually commercially pure 3-methyl-3-buten-1-ol is used, this having in general a purity of from about 85% to 99% by weight. Surprisingly, particularly high yields are obtained when the starting material is reacted in the presence of steam. This makes it possible to use directly, for the dehydration, the water-containing 3-methyl-3-buten-1-ol which is obtained in the commercial-scale production of methyl butenol from isobutylene and formaldehyde before purification by distillation. Such starting material generally contains not more than that quantity of water which is dissolved therein to saturation at approximately room temperature. Favorable results are also obtained when the starting material is dehydrated in the presence of inert gas, such as nitrogen or argon. These inert gases are normally used in quantities ranging from 10 to 90%, preferably from 30 to 60%, by volume with reference to the gaseous mixture of starting material and inert gas.

The preferred catalyst is tertiary calcium phosphate. However, other calcium phosphates, such as primary or secondary calcium phosphate, may also be used. The calcium phosphate may be used as such or supported on an inert carrier. Suitable carriers are, for example, clay fragments, titanium dioxide, pumice, natural or synthetic zeolite and carbon. The ratio of carrier to calcium phosphate is generally in the range of 20:1 to 1:5. However, we prefer to use the calcium phosphate as such. The calcium phosphate may be in the form of powder or in coarser form, such as balls, pellets or elongated extruded bodies having a diameter of, say, from 1 to 10 mm. Powdered catalyst is preferably used for example when the dehydration is effected in a fluidized bed, whereas the coarser forms are preferred when the dehydration is carried out in a fixed catalyst layer.

The dehydration is carried out at temperatures between 200° and 300° C., preferably between 200° and 280° C., particularly between 220° and 260° C. The pressure used may be varied within wide limits. In general, the process is operated at atmospheric pressure or slightly subatmospheric pressure. However, it is also possible to effect the reaction at elevated pressure, for example at 10 atmospheres, or at more reduced pressures, for example at 100 mm. Hg.

Dehydration may be effected batchwise, but it is advantageous to carry it out continuously. The dehydration may be effected, for example, by passing gaseous 3-methyl-3-buten-1-ol, if desired in admixture with steam and/or inert gas, through a tubular reactor at the temperature of reaction, the reactor being packed with calcium phosphate in the form of granules or elongated extruded bodies. The residence time may be varied within wide limits; usually it is between 0.01 and 20 seconds.

Working up may be effected, for example, by condensing the gaseous reaction mixture leaving the reactor and separating the resulting condensate, for example by distillation. Any unconverted methyl butenol is advantageously recycled to the reaction. In general, however, conversions of more than 95% can be achieved during a single passage through the reactor.

The catalyst used in the present process has a long life. When its activity begins to diminish, the catalyst may be regenerated by treatment with air and/or steam at temperatures ranging from 200° to 600° C.; thus the original activity of the catalyst is fully restored.

Isoprene is an important monomer for the production of valuable polymers such as synthetic rubbers; it is also a valuable intermediate, for example in the manufacture of terpenes.

The invention will be further illustrated by the following examples, in which parts are by weight unless otherwise stated. The parts by weight bear the same relation to the parts by volume as the kilogram to the liter.

EXAMPLE 1

2.5 parts of 3-methyl-3-buten-1-ol containing 2% of water by weight are passed in the gas phase through a vertical tube having a capacity of 1 part by volume and packed with calcium phosphate pellets having an average length of 4 mm., the temperature being 240° C. and the pressure 700 mg. Hg. The residence time is 3 seconds. The reaction mixture leaving the reaction tube is condensed and then fractionally distilled. After a single passage through the tube, isoprene is obtained in a yield of 98% of the theory.

EXAMPLE 2

2.5 parts of 3-methyl-3-buten-1-ol are passed in the gas phase, together with 1,200 parts by volume of nitrogen as inert gas, through a vertical tube having a capacity of 1 part by volume and packed with calcium phosphate pellets having an average length of 4 mm., the temperature being 240° C. and the pressure 700 mm. Hg. The rate of throughput is such that the residence time is 3 seconds. The gas mixture leaving the reaction tube is condensed and then rectified to give isoprene in a yield of 99% of the theory after a single passage through the tube.

We claim:
1. A process for the manufacture of isoprene which comprises contacting 3-methyl-3-buten-1-ol having a purity of at least 85% by weight of the total weight of oxygen-containing organic compounds present in the starting material with calcium phosphate as catalyst at temperatures ranging from 200° to 300° C.
2. A process as in claim 1 wherein the dehydration is carried out in the presence of steam.
3. A process as in claim 1 wherein the dehydration is carried out in the presence of nitrogen or argon.

References Cited

UNITED STATES PATENTS 2,853,535    9/1958    Friedman et al. _____ 260—681

OTHER REFERENCES

L. Kh. Freidlin et al.: Petroleum Chemistry U.S.S.R., vol. 4, pp. 211–220, 1965.

DELBERT E. GANTZ, Primary Examiner

V. O'KEEFE, Assistant Examiner